United States Patent
Fletcher et al.

[11] 3,891,848
[45] June 24, 1975

[54] FLUORESCENCE DETECTOR FOR MONITORING ATMOSPHERIC POLLUTANTS

[76] Inventors: James C. Fletcher, Administrator of the National Aeronautics and Space Administration, with respect to an invention of Robert T. Menzies, Pasadena, Calif.

[22] Filed: Dec. 27, 1973

[21] Appl. No.: 428,993

[52] U.S. Cl. .................. 250/345; 250/343; 250/432
[51] Int. Cl. ............................................. G01t 1/16
[58] Field of Search .......... 250/338, 339, 363, 366, 250/369, 461, 432, 340, 341, 436, 364, 345, 343

[56] References Cited
UNITED STATES PATENTS

| | | | |
|---|---|---|---|
| 3,151,204 | 9/1964 | Stacy | 250/461 |
| 3,443,090 | 5/1969 | Sundstrom | 250/364 |
| 3,649,833 | 3/1972 | Leaf | 250/432 |
| 3,725,701 | 4/1973 | Link | 250/364 |
| 3,732,017 | 5/1973 | Wolber | 250/339 |
| 3,761,715 | 9/1973 | Menzies | 250/338 |
| 3,770,974 | 11/1973 | Fertig | 250/341 |
| 3,795,812 | 3/1974 | Okabe | 250/461 |
| 3,805,074 | 4/1974 | McCormack | 250/339 |

Primary Examiner—Harold A. Dixon
Attorney, Agent, or Firm—Monte F. Mott; Paul F. McCaul; John R. Manning

[57] ABSTRACT

This invention relates to a method and apparatus for gas molecule detection. More particularly, the invention detects the presence of pollutant gas molecules in the atmosphere, an exhaust, a smokestack, or the like.

A laser source excites the atmospheric area which contains the pollutants to be analyzed. The laser's beam causes the pollutants to fluoresce and emit a return signal to the detector. The detector includes a gas cell that contains a compartment filled with the pollutant to be studied. This compartment absorbs the fluorescence from the reflected pollutant signal received at the detector. Another compartment is provided in the gas cell and the fluorescence of the reflected pollutant signal passes unimpeded through this second compartment. A difference measuring circuit detects the difference in output signals from the two compartments in order to obtain a signal indicative of the magnitude of the pollutant being analyzed.

12 Claims, 3 Drawing Figures

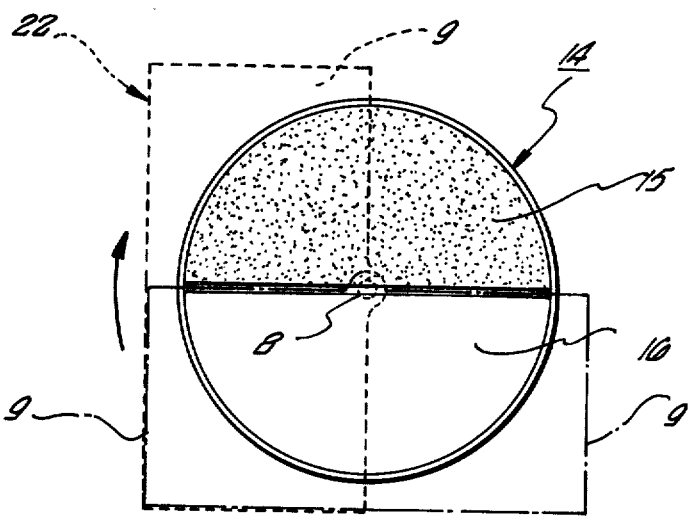
FIG_1A_
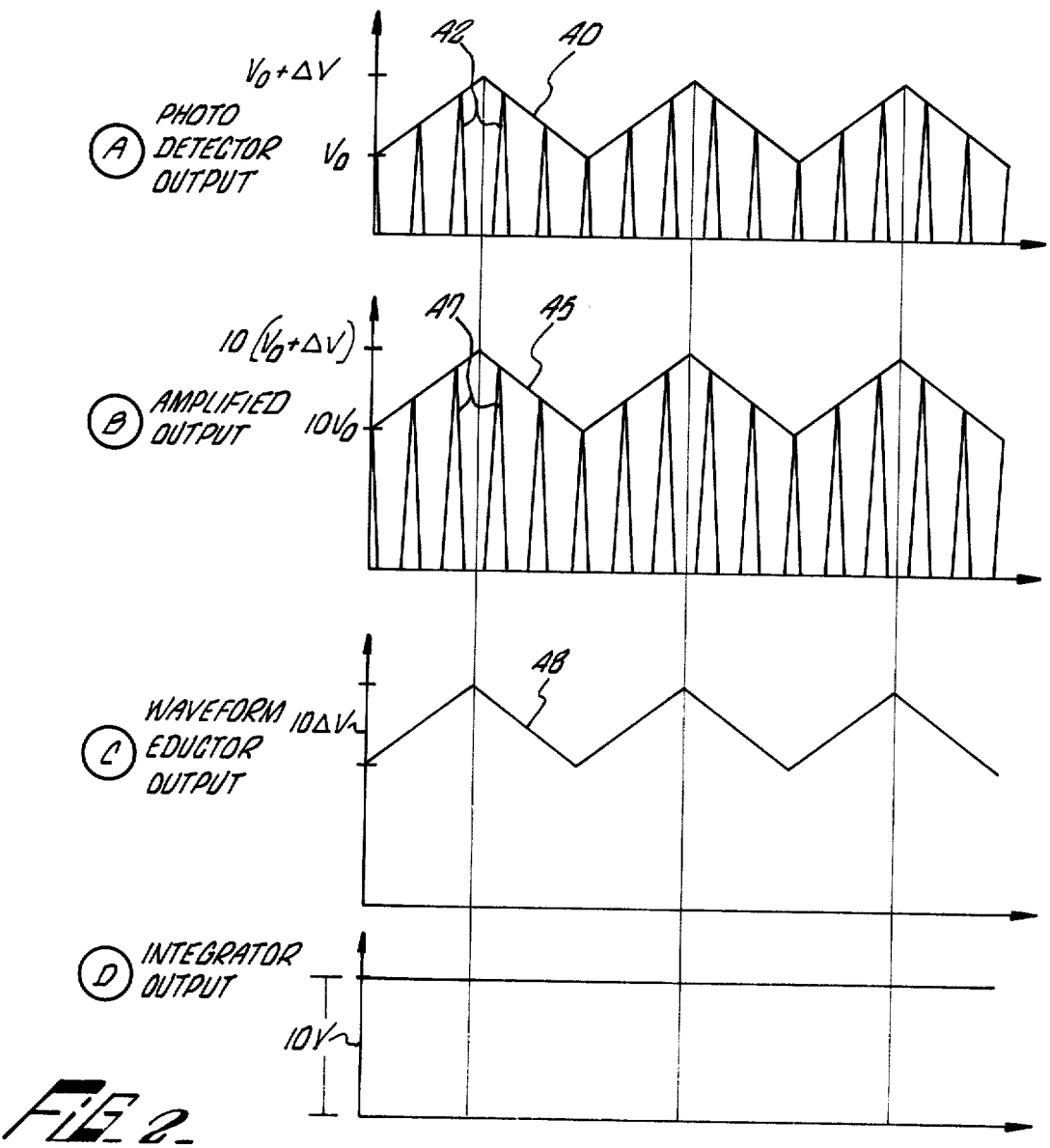
FIG_2_

FLUORESCENCE DETECTOR FOR MONITORING ATMOSPHERIC POLLUTANTS

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (72. Stat. 435; 42 U.S.C. 2457).

2. Field of the Invention

The invention relates to atmospheric pollution studies, and more particularly relates to a detector for remotely analyzing certain specific pollutants in an atmospheric area under scrutiny.

DESCRIPTION OF THE PRIOR ART

It has become essential, for ecology purposes, that the gases in smokestack plumes and the like may readily be monitored for the presence of pollutants. Such pollutants typically include nitric oxide (NO), nitric dioxide ($NO_2$), carbon monoxide (CO), carbon dioxide ($CO_2$), sulphur dioxide ($SO_2$) and ozone. ($O_3$). Emission of these pollutants can be minimized by proper adjustment and management of the combustion process feeding the stack; and, of course, by proper operation of pollution control devices located within the stack itself. Air pollution control requirements in many locations strictly limit the amount of pollutants that lawfully may be emitted. It follows, therefore, that the character and magnitude of pollutants emitted in a plume from a smokestack in question must be critically determined.

One system heretofore employed measured the darkness and density of the gaseous emissions from the plume by comparing the plume with a set of variable darkness standards. Such a system monitors smoke density only. Thus, this prior art system cannot detect invisible gaseous pollutants which are a primary factor in pollution.

Other prior art approaches include periodically physically trapping samples from the plume. The samples are thereafter chemically analyzed in a laboratory. Aside from the obvious difficulty of obtaining representative samples, the character of the plume may change considerably between the time the sample was taken and the results of the analysis are available. Furthermore, remote site surveillance is not possible in this prior art approach. Obviously, successful policing of pollution control requires pollutant monitoring from remote sites.

Another prior art approach involves the use of a tungsten wire to cause a standard pollutant gas to fluoresce. The standard was then compared with a sample of polluted air, which sample again is actually physically trapped and taken from the plume. Again this prior art approach is not suitable for a remote site application. Obtaining the pollutant sample obviously suffers from the drawbacks previously mentioned.

A critical need has long existed for a monitoring process from a remote site wherein the results are immediately available as to character and magnitude of specified pollutants. This critical need has not been solved prior to the advent of this invention.

OBJECTS AND SUMMARY OF THE INVENTION

It is well known that gases excited by an infrared illuminating source will fluoresce. The fluorescence of a gas in essence is its own signature in that the gas exhibits a specific wavelength in the infrared region. Lasers are available to provide coherent illumination at the infrared wavelengths, which wavelengths overlap the wavelengths of pollutants to be analyzed. A typical laser suitable for use in this invention is a $CO_2$ laser. Such a laser is capable of exciting the molecules of the specific pollutant gases which must be analyzed.

In the present invention, the atmospheric area of interest is illuminated by a laser. The pollutant gas molecules of interest emit their own unique fluorescent radiation in response to the laser's beam. The fluorescence is received at a receiver at the remote site. Fluorescence is passed through a gas cell preferably having at least a pair of compartments. One compartment is a reference compartment. It is filled with a specified standard pollutant gas of the same type that is to be analyzed. The other compartment is left empty. The pollutant gas in the reference compartment absorbs a high percentage of the fluorescence from the pollutant of interest, i.e. the same pollutant that fills the reference compartment. Other pollutants, of course, have also been excited by the laser beam. These others, however, pass through both compartments equally well and thus have no adverse effects on detection. An optical chopper, alternately exposes a photodetector to a signal derived from an output of the gas cell.

Suitable amplifying and demodulation of the output signal from the photodetector is readily converted into a signal indicative of the amount of the specified pollutant being analyzed. That signal is presented on a suitable indicating device, and its magnitude is representative of the magnitude of the pollutant in question.

BRIEF DESCRIPTION OF THE DRAWINGS

FIG. 1A is a plan view of the gas cell and chopper of FIG. 1.

FIG. 2 shows appropriate waveforms depicted as exemplitive of the signals appearing at various points in the schematic as shown by the use of encircled letters on FIGS. 1 and 2.

DETAILED DESCRIPTION OF THE PREFERRED EMBODIMENT

Figure 1:
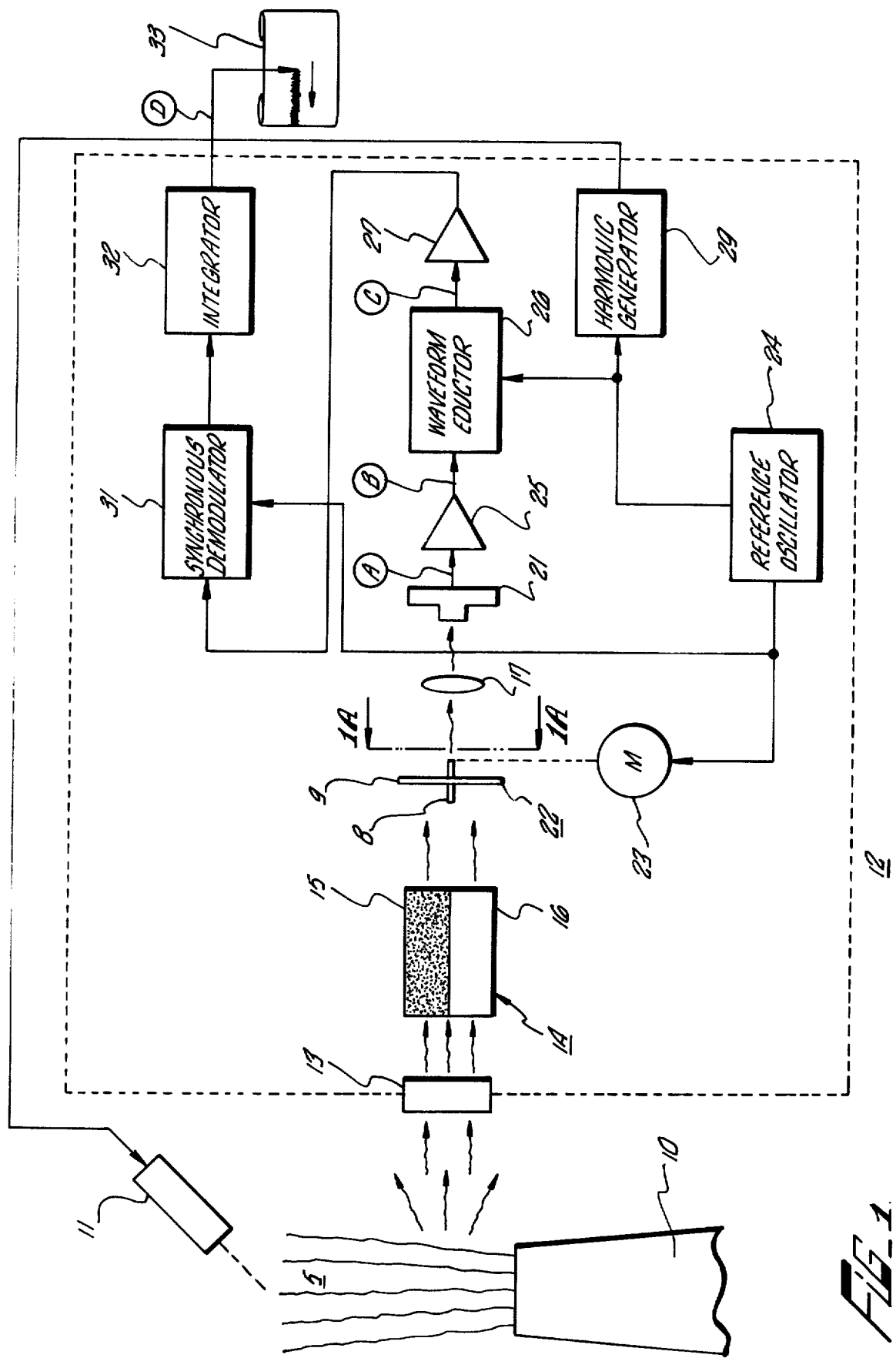
FIG. 1 is a schematic diagram of an embodiment of the remote pollutant detector of the present invention.

A pulsed laser 11 illuminates plume 5 from a smokestack 10 with a coherent infrared beam at a wavelength $\lambda_o$. The laser pulse excites several types of pollutant molecules in the plume 5. For exemplary purposes, the pollutant of interest will be assumed as nitric oxide (NO).

The nitric oxide molecules react to the laser beam by emitting a fluorescent wavelength unique to nitric oxide as compared with the other pollutants. Fluorescence produced by nitric oxide molecules is received by detector 12. Of course, radiation from other sources will also be received by detector 12.

Energy into detector 12 is passed through a filter 13. Filter 13 may be any suitable optical filter that is selected to reject radiation at the laser wavelength $\lambda_o$, and pass a desired band of wavelengths. The pass band of filter 13 is selected to include the fluorescing wavelengths from the various pollutants of interest. If the atmosphere is sufficiently clear to prevent scattering of the laser beam, filter 13 need not be employed. Generally, however, the presence of filter 13 is advantageous in the preferred embodiment of this invention.

The fluorescence energy passed by filter 13 is admitted into a gas cell 14 having transparent optical end pieces. Cell 14 has a reference compartment 15 containing a standard gas of the same type of gas that is to be monitored. Thus, in our example, a standard of nitric oxide fills compartment 15. Compartment 16 may be empty, or it may be filled with a non-interacting gas such as nitrogen or helium. A pair of compartments is depicted for purposes of simplicity in description. Obviously, as many compartments as there are pollutants to be analyzed may be employed.

It should be noted that an inert gas such as nitrogen can also be placed in the standard compartment 15 under pressure of about one atmosphere. This pressure is referred to in the art as background pressure. Its purpose is to broaden out the fluorescent absorption bands of the standard gas in the reference compartment. Such background pressure thus increases the system's efficiency and operation.

Positioned between gas cell 14 and a lens 17 is a chopper 22. FIG. 1A shows a plan view of the gas cell 14 and chopper blade 9. The chopper blade 9 is rotatable by any suitable synchronous motor 23. A reference oscillator 24 delivers a fundamental frequency, $f_o$, selected to be in the order of 100 Hz. Chopper 22 alternately allows radiation passed through cell compartment 15 and cell compartment 16 to be focussed via optical lens 17 on an input surface of photodetector 21.

Compartment 15, containing the pollutant gas, absorbs the fluorescence wavelengths of the nitric oxide excited by laser 11. The continual rotation of chopper blade 9 produces a triangular envelope 40 as shown in FIG. 2. FIG. 1A shows in solid and dashed lines chopper blade 9 positioned in two locations. The amount of energy passed and/or blocked by rotation of blade 9 varies at different positions for blade 9. If blade 9 covers entirely the output from compartment 16 (see lower position of blade 9 in FIG. 1A), the light output is at a minimum. If the blade 9 covers entirely the output from compartment 15, the light output is a maximum. Each full revolution of chopper blade 9 thus produces one triangular peak of waveform 40 as shown in FIG. 2.

Signal level $V_o$ results from fluorescence of all of the other pollutants except nitric oxide in our assumed example. This signal height of a peak relative to $V_o$ is shown as a change in voltage, $\Delta V$. $\Delta V$ thus indicates the magnitude of nitric oxide pollutant that is being measured.

As shown in FIG. 1, a harmonic generator 29 of any well known type is driven by reference oscillator 24. This harmonic generator 29, as a typical example, emits a fifth harmonic of the reference frequency $f_o$. The output signal from harmonic generator 29 thus causes laser 11 to pulse at a rate equal to five times the fundamental frequency $f_o$ of reference oscillator 24. As shown in FIG. 2, a series of pulses 42 modulates the triangular wave envelope 40. The spiked pulses 42 have a width within the envelope which is dependent upon the laser pulse duration, pollutant gas fluorescence decay time, and the size of the pollutant particulate matter. The repetition rate of the pulses 42 is at the harmonic frequency.

A suitable AC amplifier 25 amplifies the signal emitted from photodetector 21. An amplified output signal may be ten times the input as shown by comparison of signals 45, 47 with signals 40, 42 of FIG. 2. The amplified signal is next applied to a waveform eductor 26 of any well known type. As an alternative, the waveform eductor may be replaced by a box car integrator. Suitable eductor and integrator circuits are described in a sales catalog copyrighted 1970 by Princeton Applied Research.

In either event, the output signal from eductor 26 is a triangular wave 48, FIG. 2, which signal from eductor 26 is applied to a tuned amplifier 27. Amplifier 27 has a tuned frequency selected at the fundamental frequency $f_o$ of the triangular wave 40. The triangular wave is converted to a sinusoidal wave by tuned amplifier 27. The sinusoidal wave from tuned amplifier 27 contains information indicative of the magnitude of the pollutant nitric oxide in our assumed example.

Synchronous demodulator 31 of any well known type receives the output signal from tuned amplifier 27. The demodulating signal for synchronous demodulator 31 is $f_o$ from reference oscillator 24. The synchronous demodulator 31 and integrator 32 emits a DC voltage having an amplitude corresponding to the quantity of pollutant gas nitric oxide. An indicating or recording device, such as strip chart recorder 33, provides a visual recording of the amount of pollutant being monitored.

Pulsing laser 11 allows the distance from the pollutant to the detector to be determined. The waveform eductor 26 (or a box car integrator) will indicate the time delay of a received fluorescence pulse measured relative to the pulse from the reference oscillator 24. This time delay can readily be converted into distance in any well known manner. Of course, distance between the pollutant source and the detector is not always a necessary factor. If not, laser 11 may be operated continuously and waveform eductor 26 is not a mandatory component in the detector circuit.

Other modifications and variations will be obvious to those skilled in the art without departing from the teaching of the present invention. Accordingly, the scope of the invention should be limited only by the following claims.

What is claimed is:

1. A remote measuring device for monitoring pollutant gases in an atmospheric area including the subject pollutant gases, which area is located at a site remote from the measuring device, said measuring device comprising:

an infrared coherent radiation source adapted to excite fluorescence radiation in said pollutant gases at said atmospheric area;

filter means at said measuring device for blocking infrared radiation from said coherent radiation source and passing said fluorescence radiation from the excited pollutant gases;

a gas cell means in the path of said fluorescence radiation passed by said filter means, said gas cell means containing a standard sample of a known pollutant gas to be monitored for absorbing the fluorescence associated with said known gas and passing the remaining fluorescence;

a neutral cell means in the path of said fluorescence radiation passed by said filter means for passing all of said fluorescence including the fluorescence of the type absorbed by said gas cell means;

photodetector means, in response to fluorescence received from said gas cell means and said neutral cell means, for emitting an electrical difference signal indicative of the magnitude of the particular pollutant gas being monitored; and signal detecting means in circuit with said photodetector for detecting the electrical difference signal.

2. The remote measuring device of claim 1 and further comprising:

output means connected to said signal detecting means and responsive to said detected signal for indicating the magnitude of said particular pollutant gas being monitored.

3. The measuring device of claim 2, wherein said detecting means further comprises:

an amplifier connected to said photodetector means;

demodulating means in circuit with said amplifier; and an integrator connected to said demodulating means for providing a direct voltage to said output means.

4. The measuring device of claim 3, wherein said infrared coherent radiation source comprises a laser.

5. The measuring device of claim 4 and further comprising:

a chopper positioned between said cells and said photodetector;

a reference oscillator; and a motor connected to said reference oscillator and rotating said chopper, said motor being synchronized by the fundamental frequency of said reference oscillator.

6. The measuring device of claim 5, wherein said reference oscillator is connected to a harmonic generator having a second output frequency at a harmonic of said fundamental frequency, and wherein said laser is a pulsed laser, and further comprising:

means for applying said second output frequency from said generator to said laser as a pulsing signal.

7. The measuring device of claim 6 wherein said amplifier includes an AC amplifier connected to the output of said photodetector.

8. The measuring device of claim 7 and further comprising:

a signal shaping circuit connected to the output of said AC amplifier and driven by said second output frequency to synchronize the output signal from the shaping circuit with said pulsed laser.

9. The measuring device of claim 8 and further comprising a tuned amplifier connected between said signal shaping circuit and said demodulating means, said amplifier tuned to the reference oscillator frequency.

10. The measuring device of claim 2 wherein said output means comprises a strip chart recorder.

11. In a remote receiver for detecting the fluorescence signatures of several pollutant gas molecules in a gas mixture excited by a pulsed infrared laser, the combination of:

an optical filter adapted to block the infrared wavelength of said exciting laser and passing the fluorescence signatures radiated by the pollutant gas molecules;

a gas cell positioned to be illuminated by radiation passed by said optical filter, said gas cell having a first compartment and a second compartment;

a pollutant gas sample of a particular pollutant gas to be monitored in said first compartment, and a neutral gas in said second compartment;

a photodetector adapted to be illuminated by radiation passing through said gas cell;

motor driven chopper means positioned between said gas cell and said photodetector for enabling a variable radiation signal from said first and second compartments to be passed to said photodetector;

a waveform eductor in circuit with said photodetector;

a synchronizing reference oscillator having a first, fundamental frequency output connected to said motor driven chopper, and a second, harmonic frequency output connected to said laser and to said waveform eductor, whereby said chopper, said laser and said waveform eductor are synchronized;

a tuned amplifier connected to the output of said waveform eductor;

a synchronous demodulator and an integrator in circuit with said tuned amplifier to produce a direct voltage output corresponding to the amount of said particular pollutant gas; and a strip chart recorder responsive to said direct voltage output for providing a visual record of the magnitude of said particular pollutant gas.

12. A remote gas measuring device for monitoring pollutant gases in an atmospheric area of interest, said device comprising:

a laser means for causing unknown pollutant gases in said atmospheric area to fluoresce;

means for receiving the fluorescence of said pollutant gases;

means at said receiving means including a standard known pollutant gas for absorbing the fluorescence associated with said known pollutant gas in the received fluorescence of pollutant gases while passing the fluorescence associated with other pollutant gases in the received fluorescence of pollutant gases;

means for passing the fluorescence of all of the pollutant gases received at said receiving means, including the fluorescence associated with the standard known pollutant gas; and difference means responsive to said standard known pollutant gas fluorescence absorbing means and said passing means for emitting a signal indicative of the quantity of the standard known pollutant gas in the atmospheric area being monitored.

* * * * *